United States Patent
Romero et al.

(10) Patent No.: US 8,062,570 B2
(45) Date of Patent: Nov. 22, 2011

(54) METHOD OF FABRICATING A TEST BLADE OF COMPOSITE MATERIAL

(75) Inventors: Jean-Louis Romero, Melun (FR); Myriam Wozniak, Boissise le roi (FR)

(73) Assignee: SNECMA, Paris (FR)

( * ) Notice: Subject to any disclaimer, the term of this patent is extended or adjusted under 35 U.S.C. 154(b) by 167 days.

(21) Appl. No.: 11/876,278

(22) Filed: Oct. 22, 2007

(65) Prior Publication Data
US 2008/0099958 A1 May 1, 2008

(30) Foreign Application Priority Data
Oct. 26, 2006 (FR) ..................... 06 54540

(51) Int. Cl.
| B29C 70/44 | (2006.01) |
| B29C 45/14 | (2006.01) |
| B29C 45/76 | (2006.01) |
| B32B 37/00 | (2006.01) |
| D21J 3/00 | (2006.01) |
| G01D 18/00 | (2006.01) |

(52) U.S. Cl. ...... 264/258; 264/257; 264/324; 264/40.1; 378/207

(58) Field of Classification Search ................ None
See application file for complete search history.

(56) References Cited

U.S. PATENT DOCUMENTS
| 5,061,542 A * | 10/1991 | Brace .......................... 428/121 |
| 2004/0034298 A1 | 2/2004 | Johnson et al. |
| 2004/0069396 A1 * | 4/2004 | Trosman et al. ............... 156/63 |
| 2005/0084377 A1 * | 4/2005 | Dambrine et al. ........ 416/223 R |
| 2008/0099965 A1 * | 5/2008 | Romero et al. ............... 264/640 |

FOREIGN PATENT DOCUMENTS
EP 1 526 285 A1 4/2005

OTHER PUBLICATIONS

A. B. Doyum and M. Dürer, Defect Characterization of Composite Honeycomb Panels by Non-Destructive Inspection Methods, Nov. 2002, DGZfP-Jahrestagung 2002, NDT.net, Issue vol. 7 No. 11, http://www.ndt.net/article/dgzfp02/papers/p36/p36.htm.*
Roach, Dennis et al., Improving Aircraft Composite Inspections Using Optimized Reference Standards, Oct. 1, 1998, airframe/engine maintenance repair conference, pp. 1-13, http://www.osti.gov/bridge/product.biblio.jsp?osti_id=674592.*
Spencer, Floyd et al., Reliability Assessment at Airline Inspection Facilities vol. 1: A generic Protocol for Inspection Reliability Experiments, Mar. 1993, Sandia National Labs, pp. 1-35, http://oai.dtic.mil/oai/oai?verb=getRecord&metadataPrefix=html&identifier=ADA265028.*
U.S. Appl. No. 11/876,447, filed Oct. 22, 2007, Romero, et al.
William Henry Pfeifer, "Computed Tomography of Advanced Composite Materials", Advanced Composites, XP008079948, Dec. 2-4, 1985, pp. 177-188 and one cover page.

* cited by examiner

Primary Examiner — Christina Johnson
Assistant Examiner — Benjamin Schiffman
(74) Attorney, Agent, or Firm — Oblon, Spivak, McClelland, Maier & Neustadt, L.L.P.

(57) ABSTRACT

Fabricating a test blade including defects for calibrating a tomography installation for verifying similar blades. A three-dimensional blank is made by weaving fibers of synthetic material and elements of resin in the solid state are inserted into predetermined locations in said blank prior to coating it in resin.

7 Claims, 2 Drawing Sheets

METHOD OF FABRICATING A TEST BLADE OF COMPOSITE MATERIAL

The invention relates to a method of non-destructive inspection by tomography of a turbomachine blade made of composite material, more particularly a blade including reinforcement made by three-dimensional weaving. The invention relates more particularly to making a test blade for calibrating the tomography system that is to be used for inspecting all such blades during manufacture. The composite material blades as inspected in this way may in particular be the fan blades of a turbojet.

BACKGROUND OF THE INVENTION

The fan blades of a bypass turbojet can be made of composite material, i.e. material made up of synthetic fibers coated in resin. It is desired to be able to perform non-destructive and systematic inspection on all such blades. The materials used have led to X-ray tomography being selected as the most suitable non-destructive inspection method.

For example, U.S. Pat. No. 6,041,143 describes non-destructive inspection of such a fan blade by tomography. The tomographic reconstruction process is associated with the structure of the fiber mass, and in particular is constituted by plies of a sheet material. In that document, the tomographic reconstruction is adapted as a function of the plies. More precisely, at least one reference ply of a reference model is stored in a non-Euclidean coordinate system, and then when inspecting a real blade, the points of the reference ply are transformed into a system of Euclidean coordinates for the real item. This double transformation serves to show up more clearly defects that are specific to blades of that type in which the fiber mass is constituted by plies in a sheet material, in particular defects constituted by the formation of wrinkles.

The invention relates to non-destructive tomographic inspection of blades of another type that comprises a blank or preform made out of yarns or fibers woven in three dimensions. Such a blank is embedded in resin. For example, patent EP 1 526 285 in the name of the Applicant describes a blade of this kind.

During the process of fabricating this type of blade, various defects can occur. Non-destructive tomographic inspection is used to detect and evaluate such defects.

One specific defect is the formation of clumps of resin within the structure. To detect and evaluate these defects, it is necessary to calibrate the tomographic installation regularly using a test blade, and in particular one that includes such clumps of resin, that are of dimensions that are known, and that are situated at locations that are known.

The invention relates to making such a test blade.

OBJECT AND SUMMARY OF THE INVENTION

More particularly, the invention provides a method of fabricating a test blade of composite material for calibrating X-ray inspection of similar blades, the method comprising the steps of making a three-dimensional blank woven out of synthetic material fibers, inserting elements of resin in the solid state at predetermined locations in said blank, inserting said blank into a mold, and injecting resin under pressure into said mold to obtain said test blade.

Most preferably, the test blade is for calibrating a tomography installation.

The elements of resin in the solid state may be of predetermined geometrical shape. For example, it is possible to use beads that are substantially spherical in shape.

To simulate resin clumps of greater or smaller size, it is possible to use resin elements of different dimensions, for example beads having different selected diameters. In practice, beads of diameter lying in the range 2 millimeters (mm) to 10 mm have been tried with success.

During the research that led to this invention, it was found, surprisingly, that the injection of liquid resin under pressure and the subsequent treatment at high temperature did not significantly modify the positions and the integrity of the solid resin elements preinserted into the woven blank prior to injecting the liquid resin.

BRIEF DESCRIPTION OF THE DRAWINGS

The invention can be better understood and other advantages thereof appear more clearly in the light of the following description of a method of fabricating a test blade in accordance with the principle of the invention, given purely by way of example and made with reference to the accompanying drawings, in which.

MORE DETAILED DESCRIPTION

Figure 1:
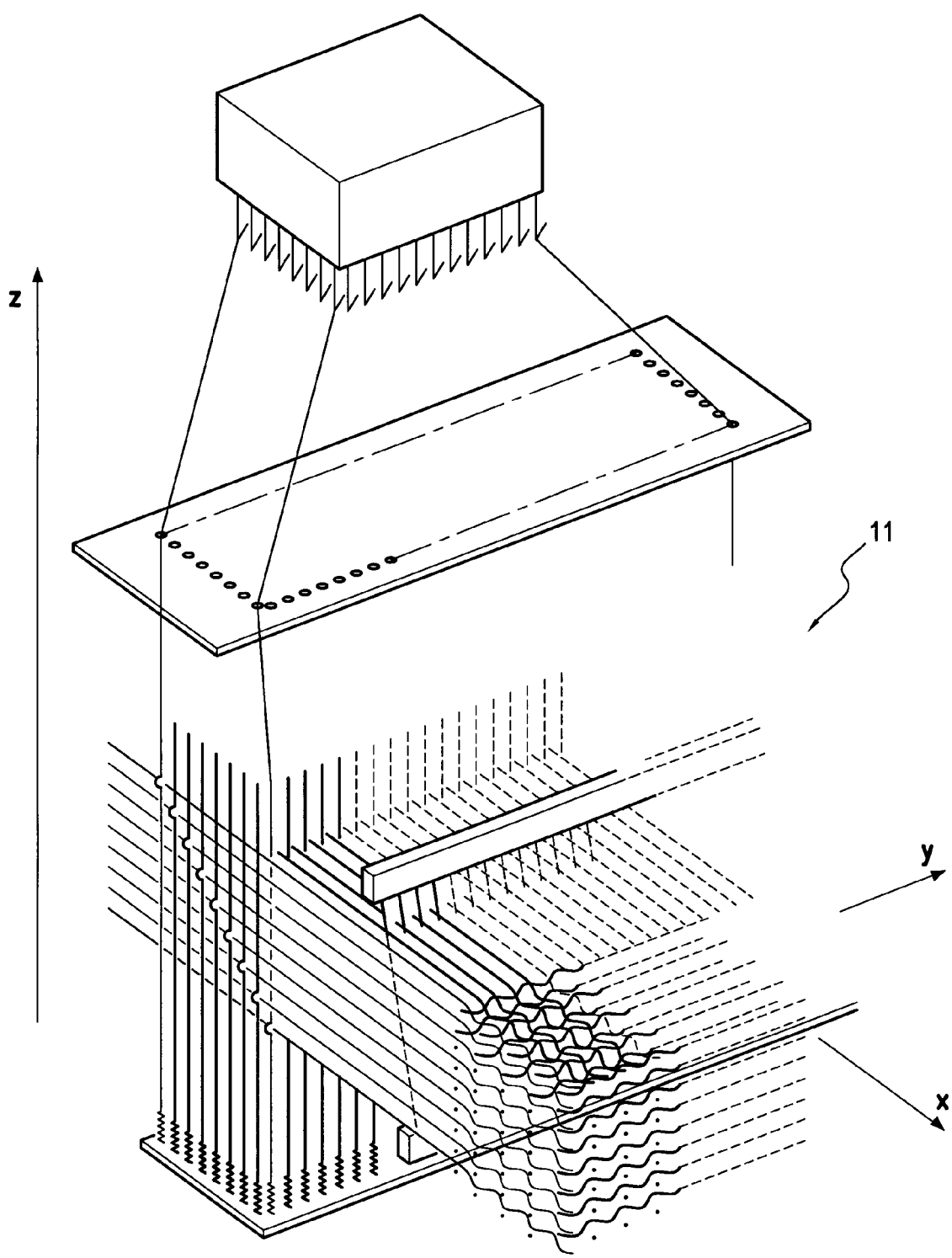
FIG. 1 shows the three-dimensional weaving of a three-dimensional blank.
Figure 2:
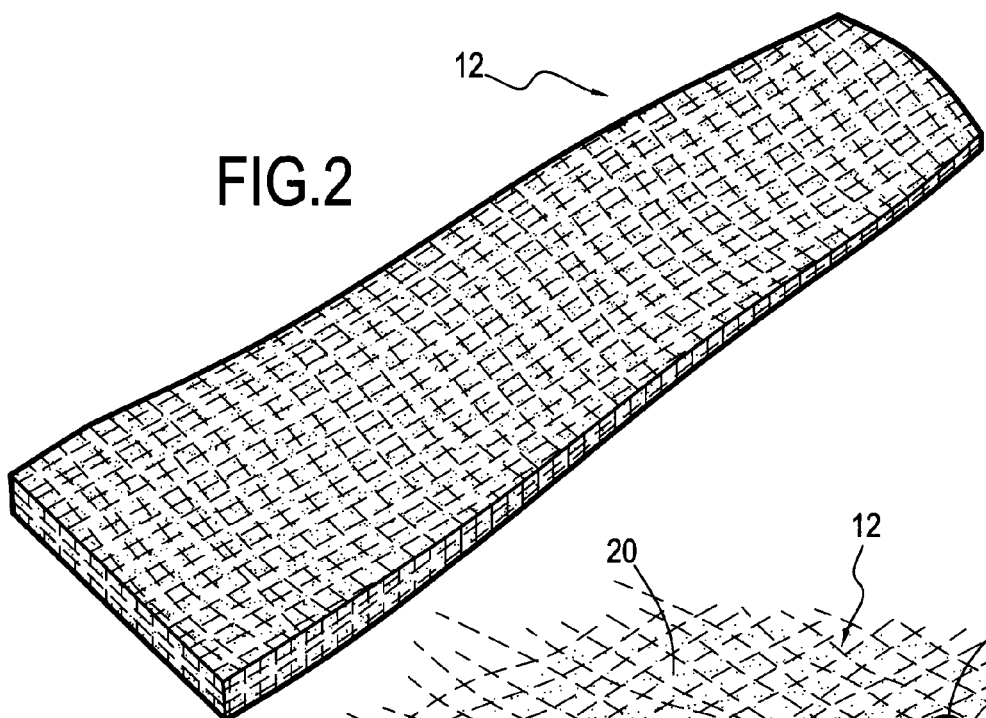
FIG. 2 is a diagrammatic view of the blank as obtained in this way.

With reference to the drawings, there is shown diagrammatically a method of fabricating a test blade that includes a stage of making a three-dimensional blank that is woven out of synthetic material fibers using a loom 11 as shown diagrammatically in FIG. 1. A step of this kind is described in EP 1 526 285, and is not described again. Nevertheless, the invention applies to any type of three-dimensional weaving suitable for making a blank 12 as shown in FIG. 2. The fibers used are preferably carbon fibers. It would also be possible to use fibers made of glass or of aramid.

Figure 3:
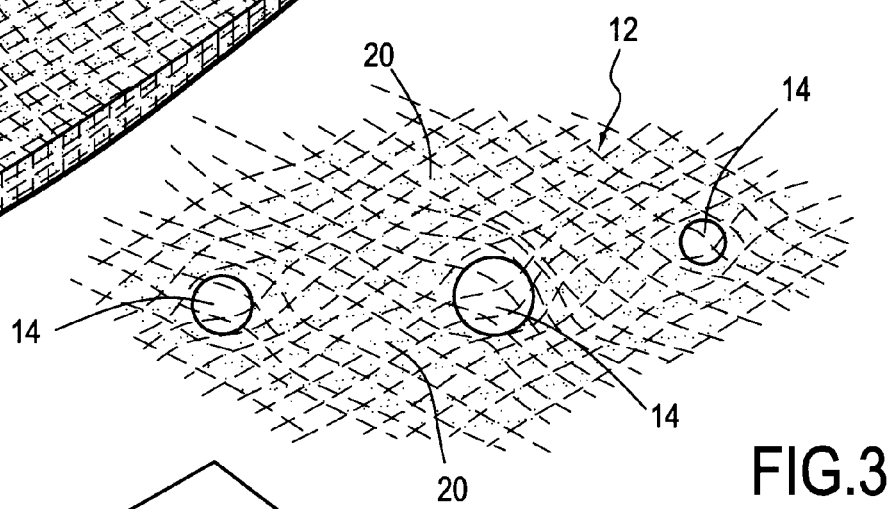
FIG. 3 shows elements made of resin in the solid state being inserted into said blank.

The following step, shown diagrammatically in FIG. 3, consists in inserting elements 14 of resin in the solid state, in this case spherical beads, into selected locations in the blank. A map of these implantations is drawn up in parallel while also storing the diameters of the beads inserted at the various locations.

The blank 12 as treated in this way is placed in a mold 16 having a cavity for the described test blade, that is similar in shape and dimensions to the type of blade that is to be subjected to non-destruction inspection by tomography. Thereafter, resin in the liquid state is injected under pressure into the mold. The mold may be heated to a temperature that encourages the resin to polymerize. Control over all these parameters comes within the competence of the person skilled in the art.

By way of example, it is possible to use an epoxy resin (known under the name PR 520) that has already been used with success. Numerous other thermosetting resins could be used, in particular other epoxy resins, polyester resins, phenolic resins, etc. . . .

For the molding stage, the following conditions have been used (none of them essential):

resin injected at 165° C. at a rate of 300 cubic centimeters per minute ($cm^3$/min) for filling the mold;

injection pressure: up to 17 bars; and baking at 180° C. for 2 hours (h).

It should be observed that other defects could be introduced into the same blank prior to injecting the liquid resin.

Figure 4:
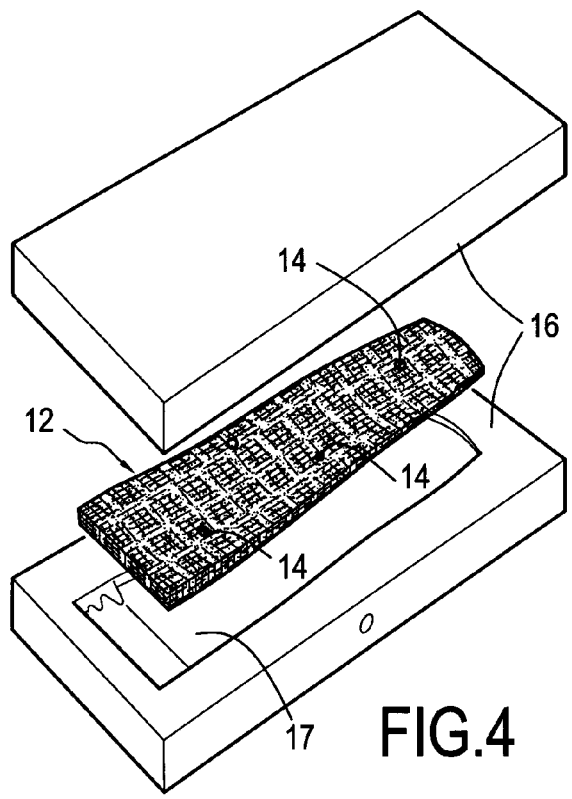
FIG. 4 shows the blank being coated by liquid resin injected under pressure into a mold.

Amongst such defects, mention can be made in particular of breaking strands or weaving as can be perceived by tomography. To be certain of having such defects at predetermined locations in the test blade, it suffices to cut certain fiber strands at selected locations, e.g. merely with the help of scissors, and to draw up a map of the cuts. Such cuts 20 are shown diagrammatically in FIG. 3. Thereafter the molding operation of FIG. 4 is performed.

Figure 5:
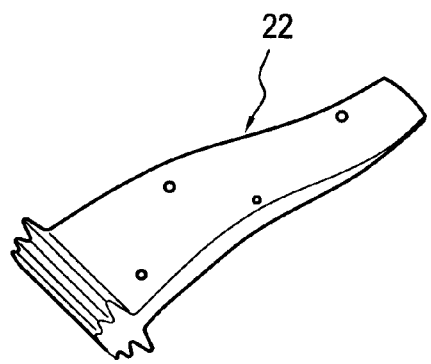
FIG. 5 shows the test blade obtained thereby.

The resulting test blade 22 obtained after molding is shown in FIG. 5.

What is claimed is:

1. A method of fabricating a test blade of composite material for calibrating X-ray inspection of similar blades, the method comprising:

making a three-dimensional blank woven out of synthetic material fiber;

inserting elements of resin in the solid state at predetermined locations in said blank;

inserting said blank into a mold; and injecting resin under pressure into said mold to obtain said test blade, wherein the resin in the solid state inserted at predetermined locations in said blank is the same resin as the resin injected into said mold to obtain said test blade.

2. A method according to claim 1, wherein the resin elements are substantially spherical in shape.

3. A method according to claim 2, wherein said spherical resin elements include a diameter between 2 mm to 10 mm.

4. A method according to claim 1, wherein certain strands of fibers are cut internally in said blank at selected locations prior to injecting the resin.

5. A method according to claim 1, wherein said injected resin is in the liquid state.

6. A method according to claim 1, wherein said mold is heated when injecting said resin under pressure into said mold.

7. A method according to claim 1, wherein the injection pressure is less than or equal to 17 bars.

* * * * *